United States Patent [19]
Klir et al.

[11] 3,727,936
[45] Apr. 17, 1973

[54] SKI OF SHAPED LAMINATED MATERIAL AND METHOD FOR ITS MANUFACTURE

[75] Inventors: Jiri Klir, Praha; Bohumil Svoboda, Pardubice; Jaroslav Bohac, Nove Mesto Na Morave, all of Czechoslovakia

[73] Assignee: Vyzkumny ustav Strojirenske technologie a ekonomiky, Praha, Czechoslovakia

[22] Filed: May 18, 1970

[21] Appl. No.: 38,130

[30] Foreign Application Priority Data

May 23, 1969 Czechoslovakia............PV 3665-69
Apr. 7, 1970 Czechoslovakia............PV 2310-70

[52] U.S. Cl.............280/11.13 L, 52/727, 161/123, 161/139
[51] Int. Cl..............................................A63c 5/12
[58] Field of Search ..................280/11.13; 9/310; 52/727; 161/139; 132, 127, 121, 123

[56] References Cited

UNITED STATES PATENTS 3,270,111  8/1966  Haldemann................280/11.13 L

FOREIGN PATENTS OR APPLICATIONS 749,836    1/1967   Canada..............280/11.13 L
1,285,981  1/1962   France..............280/11.13 L
1,356,604  2/1964   France..............280/11.13 L
6,601,356  8/1966   Netherlands........280/11.13 L
85,837     7/1955   Norway.............280/11.13 L
84,820    11/1935   Sweden.............280/11.13 L Primary Examiner—Benjamin Hersh
Assistant Examiner—Milton L. Smith
Attorney—Richard Low and Murray Schaffer

[57] ABSTRACT

A ski of shaped laminated material made as a hollow closed beam with integral walls with at least one longitudinal groove formed in the upper wall, housing a reinforcing strip. The ski being manufactured by applying a yielding fabric soaked with hardenable resin on a resilient hose, placing the whole into a mould and buildings up pressure in said hose under simultaneous heating to the hardening temperature.

8 Claims, 7 Drawing Figures

PATENTED APR 17 1973   3,727,936

JIRI KLIR
BOHUMIL SVOBODA
JAROSLAV BOHAC
INVENTORS

BY
ATTORNEY

SKI OF SHAPED LAMINATED MATERIAL AND METHOD FOR ITS MANUFACTURE

BACKGROUND OF THE INVENTION

This invention relates to a construction of skis of shaped laminated material and to a method of manufacture of skis and of hollow elongated bodies from reinforced laminated material, particularly for sporting appliances and for different technical applications.

Composite constructions of skis bonded from a number of layers using metal, wood, resin impregnated glass cloth, plastics and other combinations have been frequently offered in recent time, composed either of a number of layers subsequently worked to the proper shape, or using so called hollow cores with ribs closed by upper and lower cover layers which are with a pressed core bonded to the shape of skis in a special mould. Another construction of skis uses the so called box shape where upper and lower parts manufactured by mould pressing and having the shape of open boxes are joined so as to form a hollow space inside the ski. The lateral walls are additionally bonded in a press. Constructions are furthermore known, where pressed pieces are used, which are bonded in a mould, with a subsequent working of the product. All said constructions require pressed semiproducts which are bonded in a mould and subsequently worked by grinding, shaping, milling, decorating and similar finishing steps. Some additional surfacing is equally required. These constructions use generally known technological processes which are costly in manufacture and have functional drawbacks resulting for instance in delaminating bonded parts of individual semiproducts due to different moduli of elasticity or due to different stress resistances of the materials used and of the bond.

Due to substantial prestressing of laminated materials the tips of the skis become open or deformations occur at places where skis are bent as the bonding material generally does not have the stress parameters corresponding to stresses which originate by vibrations. In any case the material suffers from fatigue and the vault of the ski is deformed. These drawbacks have an undesirable influence on the guiding properties of skis in the course of running, the skis have a reduced capability to damp vibrations and the stability of their shape is impaired.

It is an object of this invention to provide a construction of skis which would eliminate most of the additional working processes.

It is another object of this invention to provide skis, which would have low weight, which would damp vibrations in the course of running and which would form a compact unit.

Bearing these and other objects in mind we propose skis made as a hollow beam with integral walls and with a cross section of complex configuration, having at least one groove of dove tail cross section formed in the upper wall and advantageously with a gap representing a dilatation space between the lower surface of the bottom wall of this groove and between the upper surface of the bottom wall of the ski, whereby a reinforcing strip, having uneven side walls is inserted and clamped in said groove, running along the whole length of the ski.

DESCRIPTION OF THE DRAWING

In the attached drawing several examplary embodiments of skis according to this invention are shown, FIG. 1 being a top view on a ski made of shaped laminated material, FIG. 4 is a cross section of a ski with more reinforcing strips, this cross section taken along the plane B—B' as indicated in FIG. 3a.

DESCRIPTION OF PREFERRED EMBODIMENT

Figure 1:
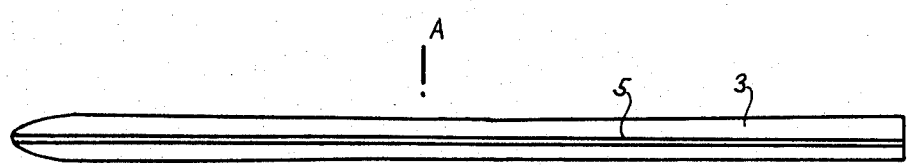
Figure 2:
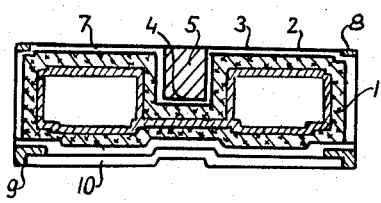
FIG. 2 is a cross section along the plane A—A' as indicated in FIG. 1, FIG. 3a to d are top views of skis with different arrangements of reinforcing strips.
Figure 4:
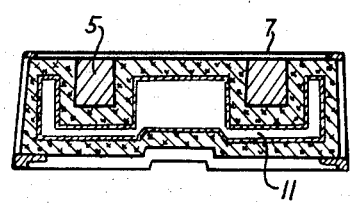

The skis according to this invention as shown in FIG. 1 and 2 represents a hollow closed beam with integral walls, with one or more reinforcing strips 5 embedded into self-locking longitudinal grooves 4 of dove tail cross section. The beam is composed of a layer 1 including fibres which are advantageously arranged to a special yielding knitted fabric or in a yielding woven fabric and of an internal closed shaping layer 2 of elastomeric material having for instance the shape of a hose. The upper surface 3 of the closed beam includes one or more logitudinal grooves 4 of dove tail cross section, into which grooves 4 reinforcing strips 5 with uneven side walls 6 are pressed in in the course of forming the beam. The depth of the groove 4 decreases from the foot board towards the front and the rear end of the ski depending on the thickness of the ski. The lower surface of the ski is provided with a runner layer 10. The edges of the beam are protected by upper protecting edge strips 8 and lower protecting edge strips 9 which are embedded between the runner layer 10 and the lower surface of the bottom wall of the beam. A cover layer 7 of pigmented plastic material provides the surface finish. The lower surface of the bottom of the groove 4 can either be in contact with the upper surface of the bottom wall of the ski body, or a gap can be formed between these surfaces, representing a dilatation space.

The reinforcing strip 5 can be made advantageously of thermoplastic material with uneven side walls, so that it can be firmly clamped between the side walls of the groove 4.

Figure 3A:
Figure 3B:
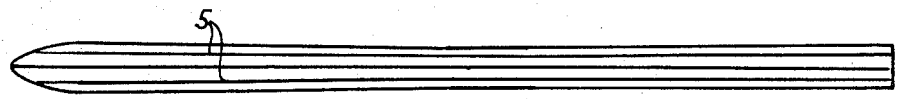
Figure 3C:
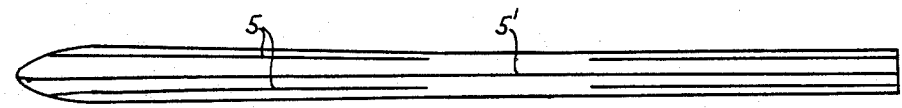
Figure 3D:
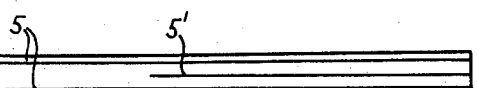

The reinforcement of the upper part of the ski can be accomplished in different alternatives as indicated in FIG. 3a to 3d. The reinforcing strips 5 can be provided within the whole length of the ski either parallel with the longitudinal axis 11 of the ski (FIG. 3a) or parallel with the lateral Telemark edges (FIG. 3b). When using an uneven number of reinforcing strips 5, the central reinforcing strip can pass within the whole length of the ski, whereas both lateral reinforcing strips, arranged parallel with the lateral Telemark edges are provided only in the front and rear part (FIG. 3c), their upper surfaces passing over into the foot board of the ski. According to FIG. 3d the reinforcing strips 5 are arranged in an opposite manner, both lateral strips being within the whole length of the ski, the central strip only in the front and rear part, and its upper surface passing over into the foot board. The lateral reinforcing strips 5 may be either parallel with the longitudinal axis 11 of the ski or parallel with the lateral Telemark edges.

As reinforcing material of the beam construction any kind of actually used fibres can be used, both natural, artificial or synthetic fibers and their combinations in the shape of mats, woven or knitted fabrics. From the point of view of mechanical strength of the manufactured products glass, metal or synthetic fibers are generally most advantageous. The fibers have to be arranged in layers so as to allow a certain capability of yielding in the shaping mould, for instance by overlapping the edges of the fabric, by distribution the fibers, by using special methods of weaving or knitting and similar. The application of diagonally woven fabrics and other fabrics with yielding properties enables to manufacture objects of rather complicated configuration with large differences of cross section. In that case the additional bonding of the hardened core with external covering layers of wood, laminated glass, thermoplastic material and similar can be eliminated. The proper reinforcing fibrous material can be soaked with a synthetic hardening resin either in advance, that is prior to forming the individual layers, or the already prepared layers can be impregnated either prior to placing into the mould or already in the mould, in the case given even after closing the mould. Any suitable kind of synthetic hardenable laminating resins can be used for impregnation, but as most advantageous have shown from the point of view of their properties polyester or epoxide resins, furthermore polyurethans, acryl-nitril-butadien-styrens and other copolymers. When selecting hardening agents and catalysts or accelerators, care should be taken that the mixtures of these ingredients with the respective resins should react slowly or only at increased temperature (generally above 50 °C) In order to prevent hardening of the impregnated layers prior to their finished shaping. As additional components of these reaction mixtures softening agents, fillers, stabilizers and other agents and different dye stuffs and pigments can be used, particularly for impregnation of surface layers, achieving thus the surface finish already in the mould. The surface finish can be also obtained by first applying a separating layer, for instance silicon oil on the internal surface of the mould, and subsequently a layer of a reactive coating material alternately with the reaction already partly finished, which layer sticks in the course of shaping to the surface of the product and which is intimately bonded with the resin in the course of hardening, or a foil or a hose of plastic material, for instance of polyethylene, acrylonitril-butadien-styren copolymer and similar can be used.

The required shaping of the layers of the stiffening material impregnated with resins is achieved in a closed mould by pressure, acting from the internal space, that is from the space surrounded by the layers. The pressure is either supplied from outside the mould by gases or liquids or is generated within the mould in the space determined by said layers by means of some material which releases gases or vapors or which is generated by foaming of certain synthetic material in this space. In order to achieve a correct forming of the impregnated layers according to the shape of the cavity, the pressure has to act only from the internal space of the layers. In order to achieve that, an auxiliary forming hose from some resilient material (for instance rubber, PVC and similar) is introduced into this space, which increases its dimensions by the action of pressure or also heat and cooperates in forming the layers according to the internal shape of the mould. In addition to that this auxiliary hose prevents any possible inhibition of the resin of the internal surface layers of the fabric or fibers by the pressure medium, particularly by components of foam generating resins (for instance when using phenol-formaldehyde resins and phenol compositions). The auxiliary forming hose is after hardening of the product either removed or remains inside the product.

Resins, which are components of the layers of the reinforcing fabric or fibers and which already contain hardening agents or catalysts and possibly also accelerators or other ingredients, are hardened by applying heat, advantageously at temperatures of 70° to 120 °C. If foam generating resins are used for building up pressure inside the layers, care should be taken that the foaming temperature remains always below the temperature for hardening the layers of fabric or fibers impregnated by resins. The hardening temperature is achieved by heating the mould with a possible cooperation of a throughgoing pressure medium subsequently heated to the required temperature. The moulds are heated by methods commonly used for presses, advantageously by electric resistors or by high frequency currents. Grooves may be provide inside the cavity of the mould for fastening different auxiliary inserts, enabling to use the same mould for manufacture of a number of objects of a similar shape. These inserts either remain parts of the mould after hardening of the product or they may form parts of the product as reinforcements.

EXAMPLES

1. Preparation of the supporting laminated core of a ski

A two part heated metal mould is lined with three layers of glass fabric, impregnated by a polyester resin of the isophtal type with additions of dimethylanilin as accelerator and dibenzolperoxide as catalyst. The fabric is wound on a resilient rubber hose so that its edges are along the whole length freely overlapping and enable until the resin is hardened a certain yielding of the layers. An outlet pressure valve is provided on one end of the hose, a safety closing valve on the other end. After closing the mould, pressure air is slowly introduced into the hose until a pressure of 10 to 15 at is built up. The mould is thereafter heated for 10 to 20 minutes to 80 °C and subsequently allowed to cool slowly to a maximum temperature of 30 °C. A constant pressure inside the mould in the course of heating is secured by adjustment of the pressure valve. After cooling of the mould, the pressure air is discharged, the laminated prefabricate removed and the further process started. The reinforcing strips 5, which may be made for instance also from a suitable thermoplastic material are in the course of this pressing embedded into the grooves 4.

2. Manufacture of ski and hockey sticks, javelins, tubes and similar

An auxiliary rubber shaping hose, on which two layers of diagonally woven hoses from glass fibers soaked with mixture of polyester resin, of a catalyst and of an accelerator are placed, with a final thin hose of dyed polyethylen are placed in a two part heated mould with a cavity of the suitable shape. After the mould is closed, water at high pressure is introduced into the rubber hose by way of an inlet valve, the pressure inside the hose being maintained by a reduction valve at 5 to 10 at. The mould is simultaneously heated to about 80 °C and after 30 minutes again cooled. After release of pressure the mould is opened and the product removed.

3. The process as described in example 2 is repeated with the difference that instead of pressure water, a phenolformaldehyde foam composition is introduced into the rubber forming hose, as generally used for the manufacture of the material bearing the trade mark POROFREN, which composition starts foaming when heated to 40° to 50 °C and forms the layers to the shape of the cavity of the mould. By a further heating of the mould to 80 °C the product is hardened after 20 to 30 minutes and is removed from the mould after cooling.

4. Manufacture of javelins

The cavity of a two part steel mould having the shape of the javelin is provided with a coating of silicon oil and yieldable diagonally woven glass fiber hose having a diameter corresponding to the minimum diameter of the javelin is placed inside the mould. The hose is soaked with a mixture of epoxide resin and of a hardening agent reacting at temperatures at least of 70 °C. Into this glass fiber hose a hose from a polyethylen foil, closed at both ends is introduced, with an aluminum cartridge with solid $CO_2$ inside said hose. The amount of $CO_2$ is determined so that after heating the mould to 80 °C and release of gaseous $CO_2$ a pressure of 3 to 5 at is built up inside the closed mould. The hardened product is after cooling the mould removed and provided with the armature and bandage.

5. The process as described in example 4 is repeated with the difference, that the internal walls of the mould are initially provided with a coating of polyvinylalcohol and thereafter with a coating of a pigmented epoxide coating material having the thickness of about 200 $\mu$ which is geletinized, whereafter the process proceeds as above described. A product with a final colored finish is thus obtained.

6. Manufacture of hollow conical tubes for fishing rods, for tent poles, ski sticks and similar A diagonally woven hose of a diameter equal to the minimum diameter of the product and soaked with a mixture of epoxide resin and of a hardening agent reacting at 70 °C is placed in a two part metal mould having a number of conical cavities coated with a separating layer of polyvinyl alcohol. Into the woven hoses are inserted hoses from a polyethylene foil, into which pressure air at 5 at is introduced. The resin is hardened by heating to 80 °C. After 30 minutes the mould is cooled and the product removed.

7. The process as described in example 1 is repeated with the difference, that instead of three layers of fabric, two knitted hoses one inserted into the other, having the thickness of 1.5 mm are used in a condition of mechanical stress.

We claim:

1. An elongated shaped article comprising a closed hollow beam formed of a core comprising a substantially flexible tubular hose and at least one layer of fabric surrounding said hose, said core being expanded to conform to the desired shape of said beam and to have at least one longitudinal groove therein, a separate longitudinal insert secured within said groove, said fabric and insert being impregnated with a hardenable synthetic resin and integrally imbedded in a molded hardened synthetic resin exterior wall structure conforming to the contour of said beam.

2. The article according to claim 1 wherein said core is provided with a plurality of longitudinal grooves, at least one of said grooves having a dovetail cross-sectional profile and the separate insert secured therein having uneven side walls engaging therewith.

3. The article according to claim 2 wherein at least one of said longitudinal grooves has a separate insert secured therein spaced from the bottom of said respective groove.

4. The article according to claim 1 including at least one additional integral layer of fabric adhered, at least in part, to the fabric layer surrounding the hose, to thereby form at least a portion of the walls of said beam.

5. The article according to claim 2 wherein said article is a ski and said profiled grooves are parallel to the longitudinal axis of the ski and arranged along the whole length of the ski, the depth of each of the grooves decreasing from the foot board of the ski to the front and rear end in dependence on the thickness of the ski.

6. The article according to claim 2 wherein said article is a ski and at least one of the profiled grooves is parallel with the lateral Telemark curves of the ski.

7. The ski according to claim 6 wherein an odd number of grooves and inserts are formed in said beam, the central one of which lies along the axis of said ski.

8. A ski formed according to claim 6 wherein at least one of said grooves rises toward the foot board so as to coincide thereat with the upper wall of said beam.

* * * * *